Patented June 26, 1934

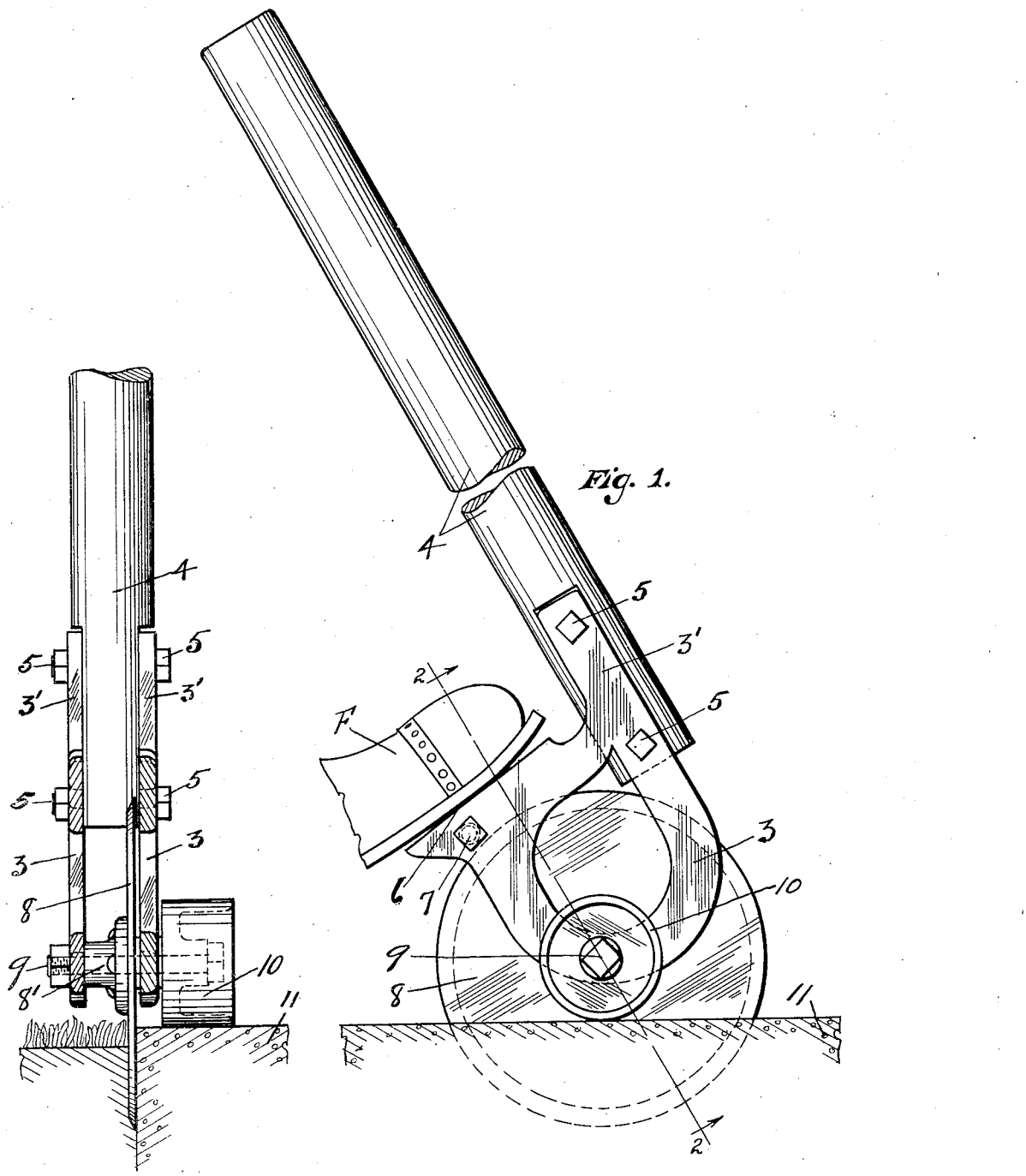

1,964,366

UNITED STATES PATENT OFFICE 1,964,366

LAWN EDGER

Joseph A. Schwarz, Los Angeles, Calif.

Application March 17, 1931, Serial No. 523,205
Renewed November 1, 1933

2 Claims. (Cl. 97—227)

My invention relates to lawn edgers and more particularly to a lawn edger which is designed for use with the foot and so constructed and arranged that the axis of the disc cutter is offset to one side of the line of the handle and with a foot rest for exerting pressure with the foot and weight of the user in a line through the axis of the cutter, thus applying a pressure or force in a line to force the cutter down into the earth and also slightly rearwardly of the cutter and its axis so as to give a forward movement thereto; to provide a lawn edger of the character referred to having a side roller turning on an axis in axial alinement with the axis of the cutter and on the opposite side of the bearing member for said cutter, whereby the foot pressure is also in a line to force said roller downwardly and forwardly as it runs on the edge of the walk or curb; and in general to provide a simple, practical and cheap lawn edger of the character referred to.

In order to explain my invention fully, I have illustrated the same on the accompanying sheet of drawing, which I will now describe.

Figure 1 is a side elevation of a lawn edger embodying my invention; and

Figure 2 is a rear view thereof, taken on the section line 2—2 of Fig. 1.

Referring in detail to the drawing, I provide two side bearing members 3, 3, each the counter part of the other, having at one side an extension 3', 3', to be bolted to the lower end of a handle 4, by means of two bolts, as 5, 5. At right angles to said extensions 3, 3, said bearing members are formed into foot rests, as at 6, to receive the foot F, said bearing members being held apart by a spacing bolt 7. In the lower part of said bearing members 3, 3, and in alinement with said foot rests, said bearing members have rotatably held therein a cutter disc 8, the axis thereof being through a bearing bolt 9, provided at one end, on the outside of the bearing member, with a roller 10, designed to run on the edge of the walk or curb, designated 11. Said cutter disc has secured to one side thereof a hub-like member 8', holding said cutter disc close to the side bearing member 3, as clearly seen in Fig. 2.

Said cutter disc 8, it will be seen, is beveled, with its straight side next to said side bearing member and next to the walk or curb 11, Fig. 2.

It is important to note that the line of pressure of the foot and the axis of the cutter disc is offset from the line of the handle 4, and is parallel therewith. In actual construction this pressure line is two and a half inches offset from the line of the handle.

So far as I am aware, I am the first to provide a simple, practical and cheap lawn edger of the character shown and described, with a single cutter disc and with its axis offset to a line of pressure for forcing it into the earth, and while I have illustrated the preferred form of my single cutter disc edger, I do not limit the invention to the showing made, except as I may be limited by the hereto appended claims.

I claim:

1. A lawn edger of the character shown and described and consisting of two spaced side bearing members, a handle secured between said bearing members at one side thereof, a foot rest formed on the upper edges of said bearing members and at right angles to said handle, a vertical cutter disc rotatably secured between said bearing members near the opposite side thereof from said handle, the axis of said cutter disc being in alinement with the line of pressure from said foot rest, and a roller element on the opposite side of one of said bearing members from said cutter disc and in axial alinement therewith.

2. A lawn edger consisting of two spaced side bearing members having extensions at one side of each and opposite each other, a handle bolted between said extensions, the top portions of said side members being at right angles to said extensions and forming a foot rest at one side thereof, a vertical rotary disc cutter mounted between said side members with its axis bearing in the lower sides thereof and also to the side opposite the side having said handle extensions, whereby said cutter axis is in the line of pressure of said foot rest, and a bearing roller at one side of said bearing members and of said cutter disc.

JOSEPH A. SCHWARZ.